United States Patent [19]

Karpenko

[11] Patent Number: 4,502,503
[45] Date of Patent: Mar. 5, 1985

[54] VACUUM BREAKER VALVE WITH INTERNALLY BALANCED DISC

[75] Inventor: Anatole N. Karpenko, San Francisco, Calif.

[73] Assignee: Anchor/Darling Valve Company, Williamsport, Pa.

[21] Appl. No.: 351,985

[22] Filed: Feb. 24, 1982

[51] Int. Cl.³ .................. F16K 15/03; F16K 17/12
[52] U.S. Cl. ............................................ 137/527.8
[58] Field of Search ............ 137/527.8, 527, 520, 137/521, 514, 527.2, 527.4, 519, 505.18, 505.17, 527.6; 74/96, 421; 251/248, 250.5, 303, 281, 229; 185/27, 29, 30

[56] References Cited

U.S. PATENT DOCUMENTS

| | | | |
|---|---|---|---|
| 301,528 | 7/1884 | Shay | 74/421 R |
| 1,479,724 | 6/1922 | MacIssac | 251/229 |
| 2,654,388 | 9/1953 | Glass | 137/527.8 |
| 3,074,429 | 1/1963 | Farrow | 137/527.8 |

Primary Examiner—Martin P. Schwadron
Assistant Examiner—John Starsiak
Attorney, Agent, or Firm—Robert G. Slick

[57] ABSTRACT

A check valve of the type having a counterweight is provided wherein the counterweight is mounted on a shaft directly above the shaft carrying the valve disc, the counterweight being connected to the shaft carrying the valve disc by gearing. By mounting the counterweight above the valve disc, the valve does not require any additional width for installation and is thus adapted for installation in tight quarters.

1 Claim, 4 Drawing Figures

VACUUM BREAKER VALVE WITH INTERNALLY BALANCED DISC

SUMMARY OF THE INVENTION

Swing check valves or vacuum breaker valves are designed to permit flow in one direction and close automatically when the flow is reversed. Functionally, they prevent back flow in a piping system. The usual check valve is partially gravity actuated; the weight of the valve initiates the first stage of valve closure while complete shutoff is obtained by the fluid backflow. For each valve size and pressure range there is a minimum differential pressure through the valve at which the flow will be stable. In a case wherein a selected valve is oversized or operating at a very low flow rate, insufficient differential pressure would open the valve disc only partially, resulting in valve fluttering and banging against the valve seat, thus causing a malfunction, noisy operation and premature wear of the moving parts. Conventional check valves are not adequate in systems like steam extraction in thermal power plants and vacuum breakers in nuclear power plants where: (1) flow varies over a wide range; (2) the valve is subject to a low pressure or a low density fluid; or (3) the system requires a high level of protection from overspeeding of a turbine-generator after load rejection or tripout.

Existing construction of steam extraction check valves do not comply with design and operating recommendations to protect or at least minimize damage of large steam turbines. Major concern of engineers, consultants and power companies is that excessive overspeed of a turbine-generator shaft can be disastrous. A second factor almost as important is that the energy contained in the feedwater heaters of a steam turbine-generator power cycle is often sufficient to contribute significantly to the magnitude of the turbine-generator rotating speed upon an electrical load rejection or tripout and must be prevented from doing so by means of check valves constructed in accordance with this invention.

Check valves in critical service have five major requirements:

1. Enough capacity to pass the fluid at a maximum flow rate.
2. Stable flow at low flow rates under small differential pressure and low fluid density.
3. Quick response to reverse flow and provide a non-sticky operation.
4. Capability of repeated closure from fully open to fully closed in tenths of a second without causing permanent deformation of the valve that would prevent shutoff of the fluid on reverse flow.
5. Convenient means for local testing that free swinging portion of the check valve is still free to move.

The present invention is an improvement over the check valve disclosed and claimed in my co-pending application Ser. No. 244,330. In that invention a counterweight was placed in a separate chamber at one side of the valve and this required that means be provided for introducing a fluid flow along the shaft connecting the counterweight to the shaft of the valve disc. Although this valve was a great improvement over prior art valves, the structure is relatively complicated and also required a side chamber which substantially increased the width of the valve assembly. This increased width made it difficult or impossible to retrofit many installations since there was insufficient clearance to accommodate the side chamber.

In accordance with the present invention, a check valve is provided which is much simpler in construction than the valve of my prior invention and also occupies no more space in width than a conventional check valve.

Accordingly, it is a primary object of the present invention to provide a vacuum breaker valve which is no wider than a conventional valve so that it can be immediately installed in place of a conventional check valve. This makes the valve particularly useful in tight quarters where no additional width is available.

Other objects and features of my invention will be brought out in the balance of the application.

DESCRIPTION OF THE PREFERRED EMBODIMENTS

Figure 2:
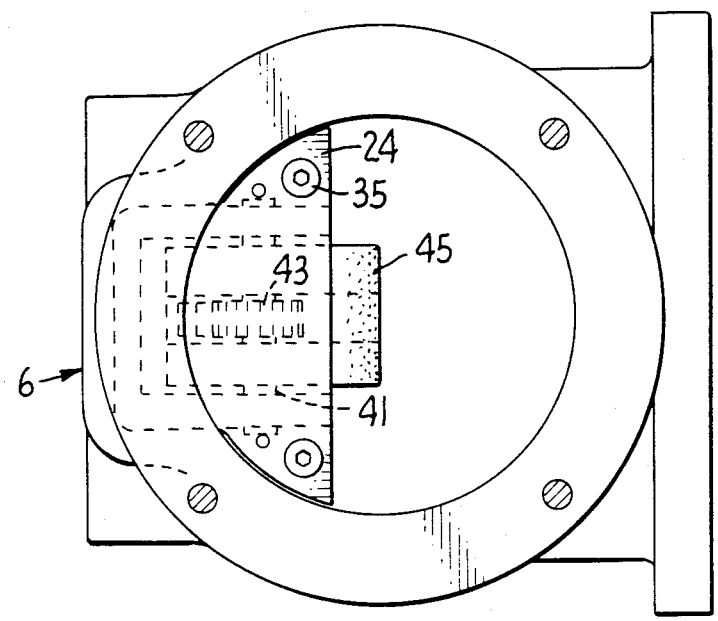
FIG. 2 is a section on the line 2—2 of FIG. 1.

Referring now to the drawings by reference characters, there is shown a valve body 6 having an inlet 7 and an outlet 8. The valve body is closed by cover 9 secured in place by studs 11 and nuts 12 permitting easy assess to the body for any servicing. The valve body includes a valve seat 14 which is preferably set at an angle of about 10° to the vertical. An annular valve disc 16 is provided to cut off reverse flow between outlet 8 and the inlet 7. The valve disc 16 is mounted upon a disc arm or hinge 17, and is supported by stud 18, nut 19 and washer 21. The disc arm 17 is mounted on a shaft 22, the shaft being mounted for rotation between brackets 23 and 25. Also mounted on shaft 22 is a spur gear 27, it being understood that both the arm 17 and gear 27 are fixed on the shaft 22 by a suitable means such as the key 29.

Arms 23 and 25 extend from bracket 24 and this bracket is mounted on inturned lips 31 and 33 by the studs 35. In this manner, the entire valve assembly can be serviced or replaced merely by taking off the cover 9.

Also mounted between the arms 23 and 25 of the bracket 24 is a shaft 37 with an idler gear 39 thereon meshing with gear 27. Mounted above shaft 37 is a third shaft 41 having a third spur gear 43 and counterweight 45 mounted thereon. Both gear 43 and counterweight 45 are fixed to shaft 41 as by key 47. Gear 43 meshes with gear 39.

Figure 1:
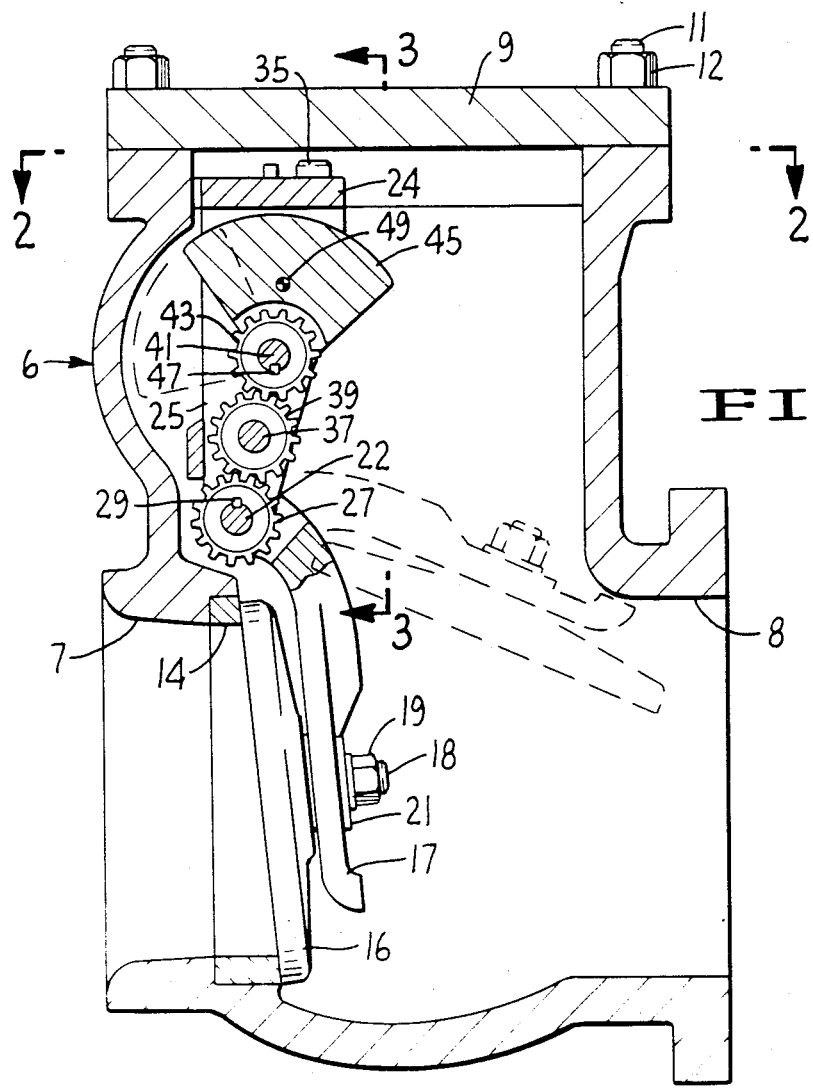
FIG. 1 is a side view, partly in section, of a check valve embodying the present invention.
Figure 3:
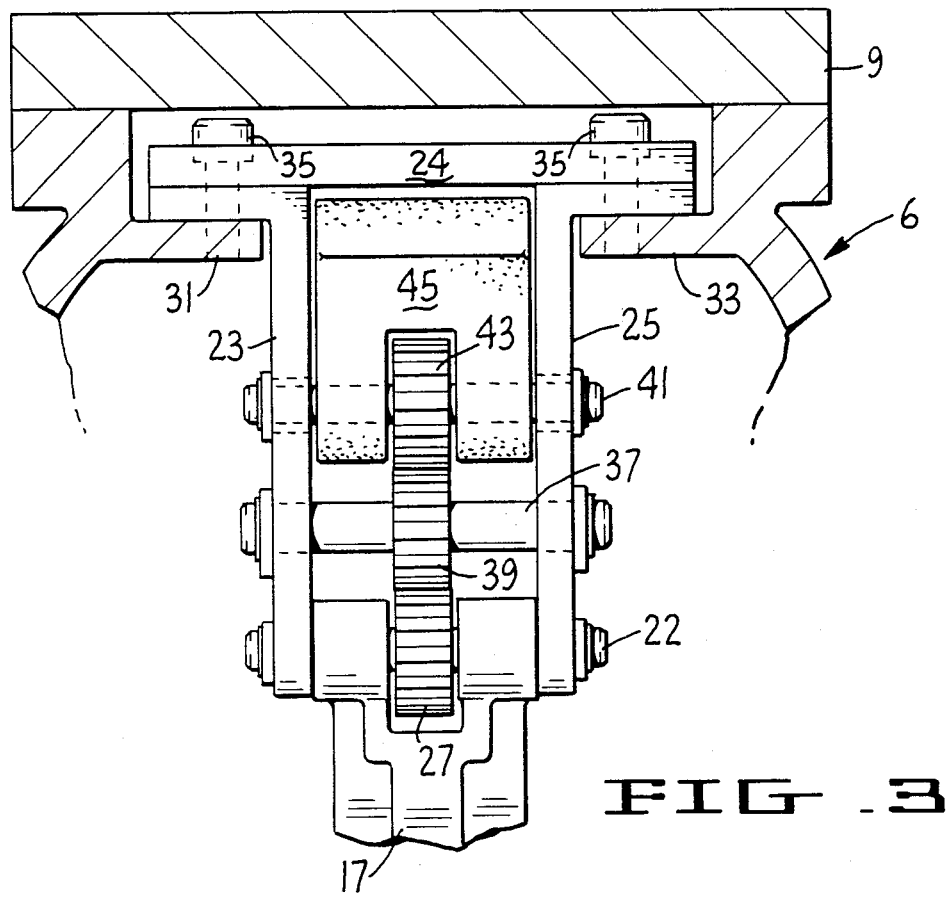
FIG. 3 is an enlarged section on the line 3—3 of FIG. 1.
Figure 4:
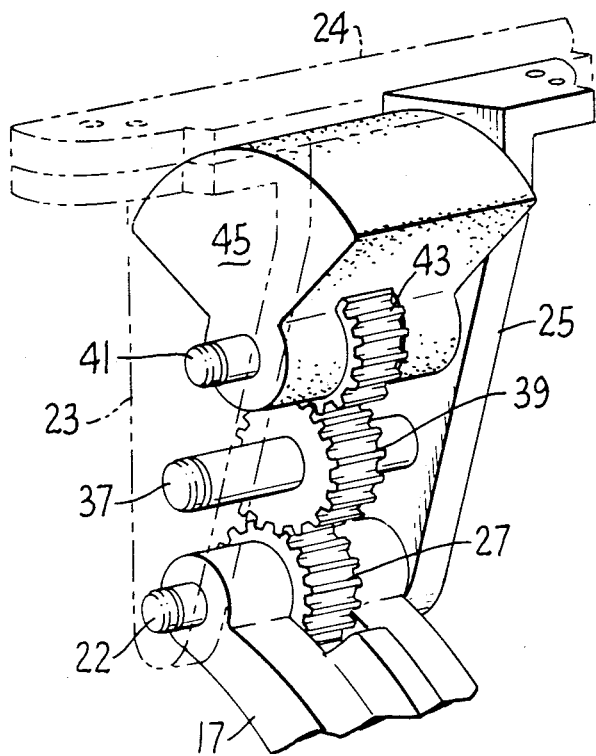
FIG. 4 is a perspective view of the counterweight and gear assembly.

It will be apparent from the description thus far that any motion of the valve disc is transmitted to the counterweight and vice versa through the function of the gears. Thus when the valve is closed, parts are in the position shown in solid line in FIG. 1, while when it is open, parts are in the position shown in phantom.

As previously stated, the face of valve seat 14 is provided at an angle of about 10° to the vertical. Counterweight 45 is mounted on shaft 41 so that its center of gravity 49 is advanced by about 5°. Thus, when the valve plate 16 is seated against the face 14, face 14 being at an angle of approximately 10° to the vertical, the counterweight 45 will be in advance of the vertical and thus add to the weight of the valve disc and arm so that the forces add to provide an effective closing bias on the valve plate. On the other hand, when the valve opens, the counterweight passes over center and now tends to offset the weight of the disc, so that the valve will stay open and not flutter under conditions of low flow.

Although a specific embodiment has been illustrated, many variations can be made without departing from the spirit of this invention.

I claim:

1. A check valve comprising
   a valve body having an inlet and an outlet valve seat means in said body being disposed at an angle with respect to vertical so as to be upwardly inclined toward said inlet;
   a first shaft rotatably mounted in said body adjacent said valve seat, said shaft having a valve disc fixedly mounted thereon for rotation therewith, said valve disc being located in said valve body to seat on said inclined valve seat to interrupt fluid flow between said inlet and said outlet;
   a counterweight fixedly mounted on a second shaft for rotation therewith and located directly above and parallel to said first shaft in such a manner that the weight of the valve disc and the counterweight tend to keep the valve closed when the valve is closed and wherein the counterweight offsets the weight of the valve disc when the valve is open and tends to keep the valve open, and gear means mounted for rotation on said first, second and a third shaft between said first and second shafts for transmitting motion between said first and second shafts.

* * * * *